United States Patent
Sjöö et al.

(10) Patent No.: US 6,682,273 B2
(45) Date of Patent: Jan. 27, 2004

(54) TOOL HOLDER HAVING A CLAMP PLATE FOR TRANSMITTING CLAMPING FORCES FROM A CLAMPING ARM TO A CUTTING INSERT

(75) Inventors: Sture Sjöö, Gävle (SE); Per Hansson, Gävle (SE)

(73) Assignee: Sandvik AB, Sandviken (SE)

( * ) Notice: Subject to any disclaimer, the term of this patent is extended or adjusted under 35 U.S.C. 154(b) by 0 days.

(21) Appl. No.: 10/119,086

(22) Filed: Apr. 10, 2002

(65) Prior Publication Data

US 2002/0131830 A1 Sep. 19, 2002

Related U.S. Application Data

(62) Division of application No. 09/588,065, filed on Apr. 26, 2000, now Pat. No. 6,394,709.

(30) Foreign Application Priority Data

Apr. 26, 1999 (SE) ................................................ 9901478
Apr. 26, 1999 (SE) ................................................ 9901479

(51) Int. Cl.[7] .............................................. B23B 27/16
(52) U.S. Cl. ........................ 407/105; 407/107; 407/104; 407/103
(58) Field of Search ................................ 407/102, 103, 407/104, 105, 106, 107, 108, 109, 111, 112, 5, 2, 100; 30/349; 408/231

(56) References Cited

U.S. PATENT DOCUMENTS

| 2,799,079 | A | | 7/1957 | Brigner, Jr. | |
|---|---|---|---|---|---|
| 3,084,416 | A | * | 4/1963 | Broughton | 407/104 |
| 3,102,326 | A | * | 9/1963 | Conti | 407/104 |
| 3,303,553 | A | | 2/1967 | Severson | |
| 3,314,126 | A | | 4/1967 | Stier | |
| 3,683,473 | A | * | 8/1972 | Joynson | 407/105 |
| 3,703,755 | A | * | 11/1972 | Guensche | 407/112 |
| 3,731,356 | A | | 5/1973 | Gowanlock | |
| 4,189,264 | A | * | 2/1980 | Kraemer | 407/114 |
| 4,252,038 | A | * | 2/1981 | Subramanian et al. | 407/119 |
| 4,714,384 | A | * | 12/1987 | Lagerberg | 407/103 |
| 4,938,639 | A | | 7/1990 | Lockard | |
| 5,944,457 | A | | 8/1999 | Tjernström | |
| 6,146,062 | A | * | 11/2000 | Jansson | 407/107 |

FOREIGN PATENT DOCUMENTS

| EP | 143569 A1 | * | 6/1985 | ........... B23B/27/16 |
|---|---|---|---|---|
| EP | 0 960 676 | | 12/1999 | |

* cited by examiner

*Primary Examiner*—Erica Cadugan
*Assistant Examiner*—Dana Ross
(74) *Attorney, Agent, or Firm*—Burns, Doane, Swecker & Mathis, LLP (57) ABSTRACT

A cutting insert is clamped in a pocket of a holder by a top clamp assembly which includes a clamp arm screwed to the holder, and a clamp plate interposed between the insert and a front part of the clamp arm. The clamp plate is formed of a harder and more wear-resistant material than the clamp arm and transmits clamping forces from the clamp arm to the cutting insert. The hard clamp plate shields the clamp arm from being impacted by chips generated during a machining operation, thereby minimizing wearing of the clamp arm.

5 Claims, 6 Drawing Sheets

Fig. 13

TOOL HOLDER HAVING A CLAMP PLATE FOR TRANSMITTING CLAMPING FORCES FROM A CLAMPING ARM TO A CUTTING INSERT

This application is a divisional of application Ser. No. 09/558,065, filed on Apr. 26, 2000, now U.S. Pat. No. 6,394,709.

BACKGROUND OF THE INVENTION

The present invention relates to a tool holder intended for chipforming machining of metallic workpieces, and especially to a clamping mechanism for clamping a cutting insert.

There exists a variety of tool holders for the mechanical clamping of cutting inserts such as rhombic, rhomboidic and triangular indexable inserts with equal angles all around the insert. The material used for such inserts is normally cemented carbide material or ceramic material.

A commonly used locking system for such indexable inserts includes a pin in the holder extending upwardly into the insert-receiving pocket to engage a hole in the insert located in said pocket, and means for forcing said pin to be subjected to a pivoting movement inwardly towards said holder. The forcing means is arranged to actuate the lower portion of said pin, thus urging both the pin and the insert inwards towards an upwardly extending wall formed on said holder rearwardly of said pocket. Such type of tool holder is disclosed in U.S. Pat. No. 3,314,126. The drawback of such holder, however, is that the forward nose portion of the cutting insert has a tendency of lifting off the shim plate located underneath said insert which sometimes can lead to insert failure.

It is also common to clamp the insert using a top clamp arm. However, a front portion of the clamp arm tends to wear too rapidly, especially as a result of being struck by chips created during machining operations.

In view thereof it is an object of the invention to provide a tool holder such that a clamp arm acting on the insert will ensure that the insert is pushed both downwards and inwards. At the same time, it is desirable that a front portion of the clamp acting on the insert can, in the best possible way, be protected against wear from the chips obtained during machining from the workpiece. It is also desirable to provide a tool holder that enables using both solid inserts and centrally apertured inserts in such holder.

SUMMARY OF THE INVENTION

All these desires can be fulfilled by providing said forcing means in the shape of a clamp arm actuated by a clamping screw which is provided with first and second contact surfaces. The first contact surface is provided on a forward protrusion of said clamp arm, and the second contact surface is provided on a rear protrusion of said clamp arm for engagement with a contact surface that is inclined in relation to the axis of said clamp screw. The forward protrusion of the clamp is received in a recess of a hard (preferably carbide) clamp plate that is interposed between the insert and the clamp arm, whereby the clamping forces are transmitted from the clamp arm to the insert through the clamp plate.

BRIEF DESCRIPTION OF THE DRAWINGS

The invention will now be described more in detail by reference to the enclosed drawings, which illustrate a preferred embodiment of the invention.

DETAILED DESCRIPTION OF PREFERRED EMBODIMENTS OF THE INVENTION

Figure 1:
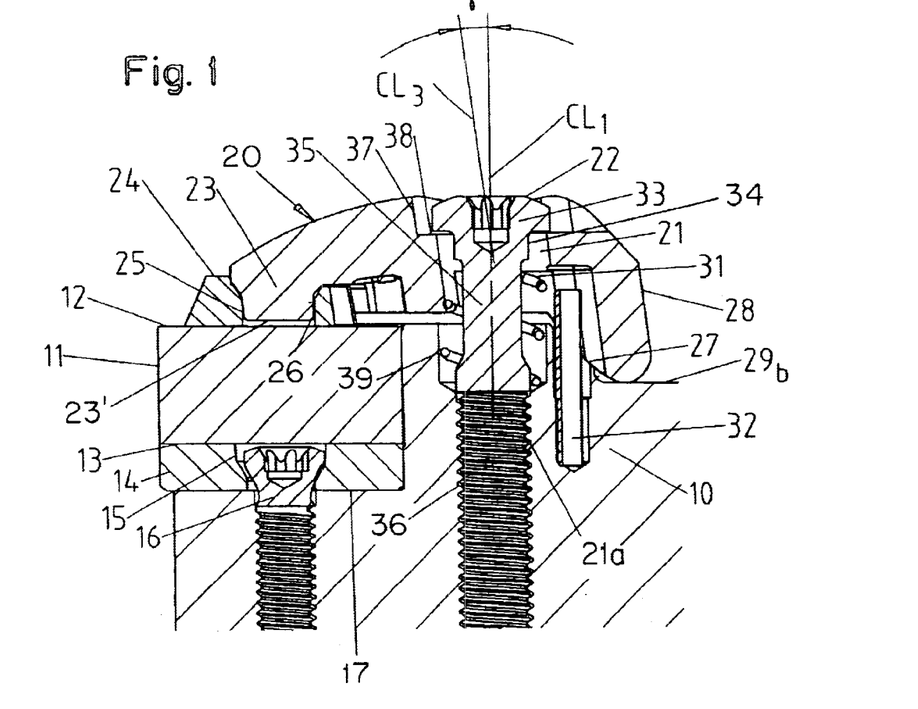
FIG. 1 is a longitudinal sectional view taken along an axis CA of a tool holder as shown in FIG. 2 according to one embodiment of the invention.
Figure 2:
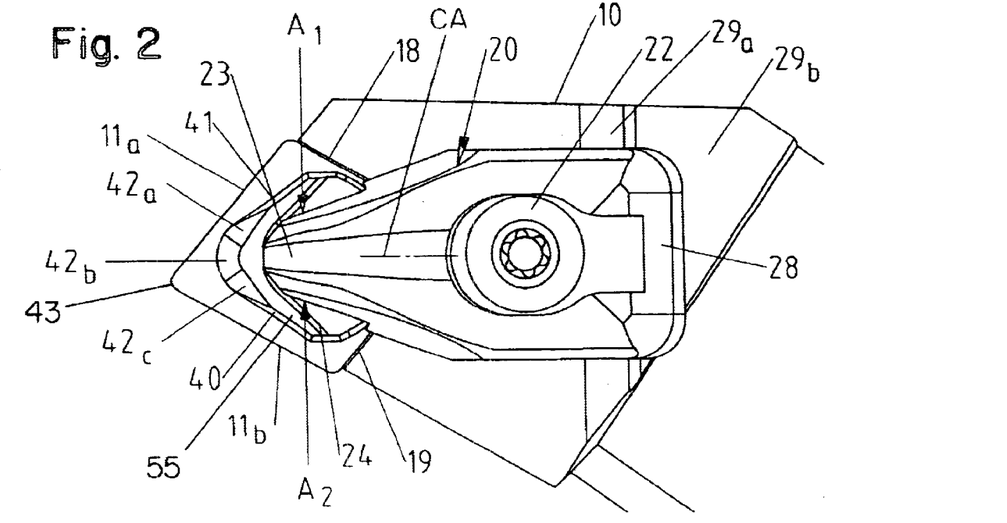
FIG. 2 is a top plan view of a clamp and the insert of the tool holder shown in FIG. 1.

In FIGS. 1–2 there is shown a portion of a cutting tool (preferably for turning operations) comprising a partially shown tool holder 10, the forward nose portion of which is provided with a pocket for the receipt of an indexable cutting insert 11 of polygonal shape. This insert has a rhombic basic shape and is manufactured of cemented carbide material or ceramic material. The insert has an upper flat surface 12 and a lower flat surface 13 parallel with said upper surface. The insert has a plurality of side surfaces extending perpendicularly towards said upper and lower surfaces 12, 13, two of which are designated 11a and 11b. The insert is arranged to rest in surface abutment upon a shim plate 14 having a central hole 15 engaged by a screw 16 that is threadably engaged with the holder 10 the central axis of which extends perpendicularly against the flat surfaces 12, 13 of the insert. The insert-receiving pocket includes a bottom supporting surface 17 and two support surfaces 18, 19 extending perpendicularly therefrom.

There is a clamp arm 20 provided for the clamping of the insert into its pocket in the holder 10, said clamp arm being actuatable by means of a clamp screw 22 that extends entirely through said clamp arm and includes a threaded lower portion 21a that threadably engages a bore 21 in the holder 10. The central axis CL of said screw extends parallel with the central axis of the hole 15 in the shim. The forward end of said clamp is in the shape of a first protrusion 23 intended to engage a clamp plate 24 located between the clamp arm 20 and said insert 11, said clamp plate 24 having a central hole 25. More specifically, said first protrusion 23 is arranged, upon tightening said screw 22, to be received in said hole 25 thereby exerting a downward pressure on the clamp plate which is transmitted to the insert. Preferably, the clamp arm applies a pressure downwardly at pressing points $A_1$ and $A_2$ (see FIG. 2) on an upper surface 55 of the clamp plate (FIG. 8) at respective sides of a longitudinal center axis CA of the clamp arm 20. The central hole 25 is a recessed bore which is of symmetrical configuration about its vertical axis. The hole 25 includes a lower cylindrical wall and a coaxial slightly conical upper wall which expands upwards with gradually increasing diameter in the direction from the lower wall to the entrance opening of the hole 25. The forwardly facing portion (i.e., leftward facing portion in FIG. 1) of the mantle or outer surface of the protrusion 23 is given a corresponding configuration to the wall of the hole 25. The underside 24a of said clamp plate 24 is ground to a planar state and has a large surface area, whilst the lower wall of the hole 25 is cylindrical. This ensures a distribution of the clamping pressure over a large surface of the insert, which is essential, especially in case the insert is manufactured of ceramics.

The opposite rear part of said clamp arm 20 is in the shape of a second protrusion 28 which has an inclined surface 27 that is preferably convexly shaped and arranged, upon tightening, to come into surface abutment with a correspondingly inclined surface 29a on the holder 10, as is known. The surfaces 27, 29a are inclined at the same angle relative to the central axis $CL_1$ of said clamp screw 22. At 29b there is designated a lower support surface of the holder 10. The clamp arm 20 can be tightened by means of the screw 35 that acts against a spring 31 that is partially received in the bore 21. The spring 31 is inclined to urge the clamp upwardly and rearwardly. Mounted to the holder is a pin 32, acting as stop means, which ensures that the clamp arm 20 does not rotate upon tightening said screw 22.

The clamp screw 22 has an upper flange-formed head portion 33 integral with an adjacent cylindrical portion 34 of somewhat smaller diameter than said head portion. The portion 34 is integral with a cylindrically shaped waist portion 35 of smaller diameter than said cylindrical portion 34. The waist portion 35 extends into a lower threaded portion 36 of the screw, the diameter of which is larger than the diameter of the waist portion 35. Upon tightening, the top surface of the head 33 of the screw becomes essentially flush with the surrounding upper surface, and the head 33 is entirely received in a recess 37 of said clamp arm 20 such that the radial undersurface of said screw head 33 is located in abutment against a corresponding radially extending surface 38 in the recess 37.

The coil spring 31 extends around the upper portion of the clamp screw 22, so that the clamp is displaced upwards upon loosening the screw 22. The spring 31 extends axially along the cylindrical waist portion 35 and is partially received in the inclined bore 21 in the clamp arm 20 and is partially received in a cylindrical recess 39 in the tool holder. More specifically, the central axis $CL_3$ of said bore 21 extends at an acute angle γ in relation to the central axis $CL_1$ of said screw 22 and said threaded portion 36. In accordance with a suitable embodiment the size of the angle γ is in the range of 2–15°. As appears from FIG. 1 the upper portion of said coil spring 31 is received in said inclined bore 21, the arrangement being such that there is a certain play between said cylindrical portion 34 and the wall of said inclined bore 21 such that the clamp is not rotated in response to tightening of the screw. The upper portion of said coil spring 31 is brought into surface contact with the wall of said inclined bore 21.

The arrangement is such that upon tightening the screw 22 the lower portion 28 of the rear end surface of said clamp comes into surface abutment with surfaces 29a and 29b. It is to be understood that once the clamp portion 28 has come into contact with said surface 29b the clamp will be subjected to a certain rotation movement such that the forward clamp portion 23 establishes a downward pressure which is transmitted to the insert via the press plate 24 to achieve a firm efficient insert clamping. At the same time it is important to ensure that the downwardly facing end surface 23' of said clamp portion 23 is arranged with a certain play or gap in relation to the top surface of the insert as is shown in FIG. 1. By having the forward protrusion 23 of the clamp arm 20 received in recess 25 of said clamp plate 24, it is also ensured that the upper portion of said protrusion 23 does not becomes subject to wear under the impact of rearwardly directed chips from the metalworking machining process. This effect is furthermore enhanced by the fact that the forward portion of said press plate 24 is higher than the rear portion of said clamp plate.

As mentioned above, the upper portion of coil spring 31 is received in the inclined bore 21 of the clamp whereas the lower portion of said coil spring 31 is partially received in a cylindrical recess 39 in said holder 10, the central axis of which is the same as the central axis $CL_1$. The recess 39 extends to the threaded bore 21, which receives the threaded portion 36 of the clamp screw 22.

The clamp plate 24 of the invention is made of a material having a greater wear resistance and higher hardness than the material of the clamp arm 20. The clamp plate 24 is preferably made of cemented carbide. In a preferred embodiment the thickness of said clamp plate is essentially smaller than the thickness of the cutting insert 11. The forward end surface of said clamp plate 24 is defined by two forwardly converging flat side face portions 40 and 41 which are interconnected by a curved nose portion 42. The nose portion has a radius of curvature that is essentially larger than the radius of the respective corner portion 43 of the cutting insert. The forward side face portions 40 and 41 of the clamp plate 24 are inclined forwards and downwards towards the top face of the insert as appears in FIG. 2 and FIGS. 7–8. The angle of such inclination lies in the range of 5–15° and is smaller than a corresponding downwardly inclined angle of the nose portion 42. The nose portion 42 includes a central curved portion 42b and side segments 42a and 42c on both sides thereof. These side segments 42a, 42c. should preferably be inclined downwardly at an angle of 20–45°, which is greater than the 5–15° angle of the side face portions 40, 41. This relationship between the angles accomplishes a more efficient change of the direction of movement of the chip when it approaches the said side segments 42a, 42c.

Figure 3:
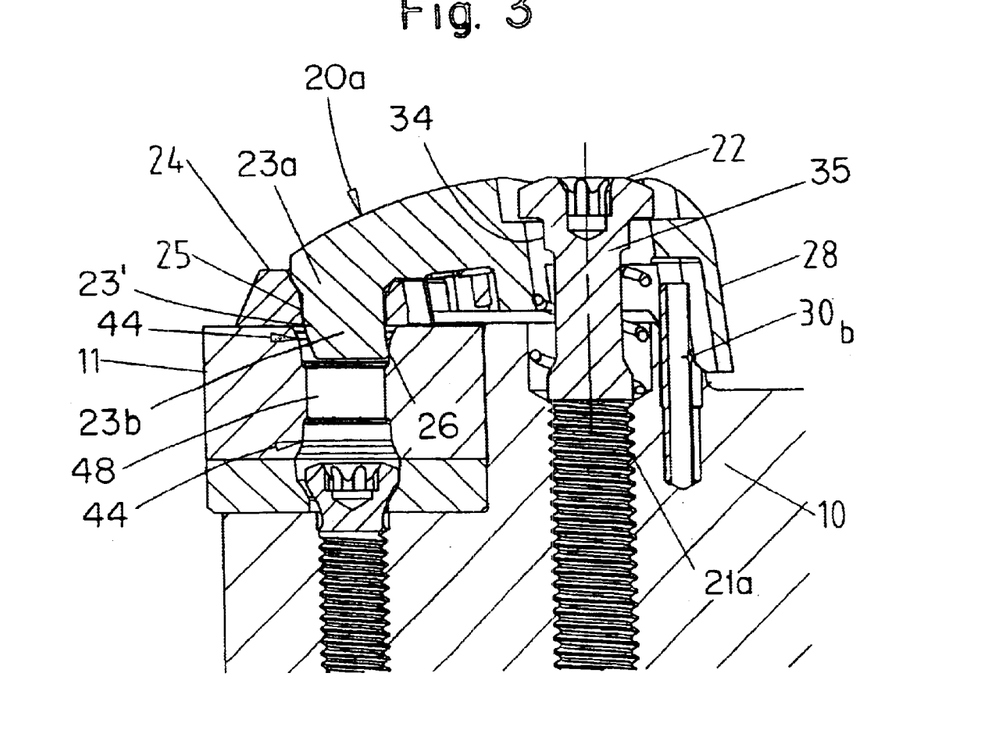
FIG. 3 is a longitudinal sectional view of an alternative embodiment of a tool holder of the invention.
Figure 4:
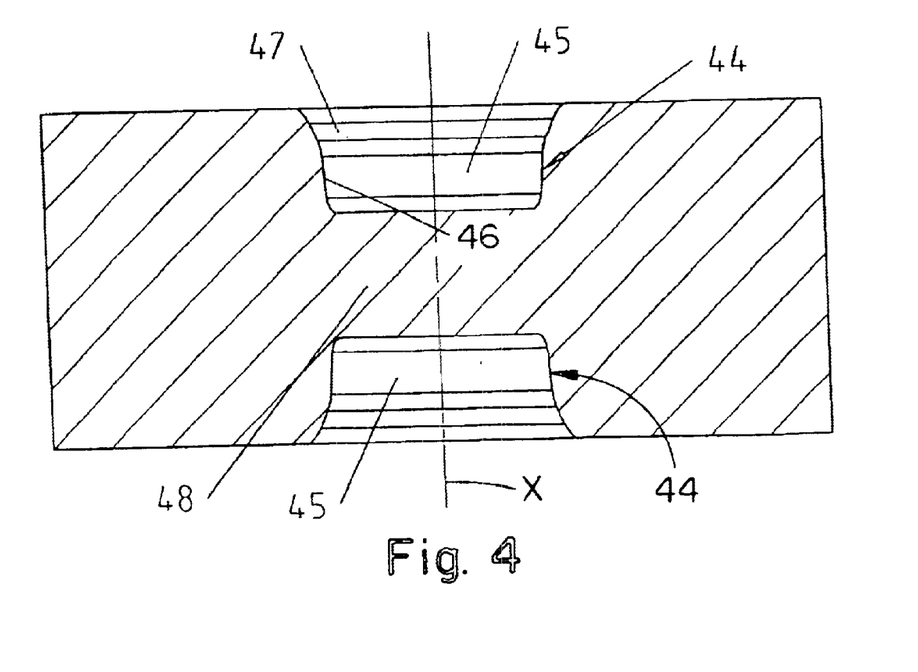
FIG. 4 is a longitudinal sectional view of the insert shown in FIG. 3.

In FIGS. 3 and 4 there is shown an alternative embodiment of the invention. In this case the protrusion 23' of the clamp arm 20a is defined by a lower portion 23b that extends in a downwards and inwards direction, and an upper portion 23a that extends straight downwards. The entire protrusion 23' has a much longer longitudinal extension as compared with the embodiment in FIGS. 1–2. More specifically, the protrusion 23' now extends entirely through the central hole 25 of the clamp plate 24 and additionally also extends downwards into a central recess 44 provided in the insert 11. The arrangement is such that the lower end portion of said protrusion comes into engagement with the lower portion of the wall of said recess 44. The insert 11 has more specifically been provided with a pair of such recesses 44 each being of a symmetric form about its axis and comprising a longitudinally inner cavity 45 which is delimited by a cylindrical or slightly conical surface 46 and a longitudinally outer cavity 47 which expands outwards with a gradually increasing diameter toward an entrance opening in the top (or bottom) face of the insert. The recesses 44 are shown as interconnected by a cavity 48, but the cavity 48 is not required; instead, the area between the recesses 44 could be solid.

Figure 5:
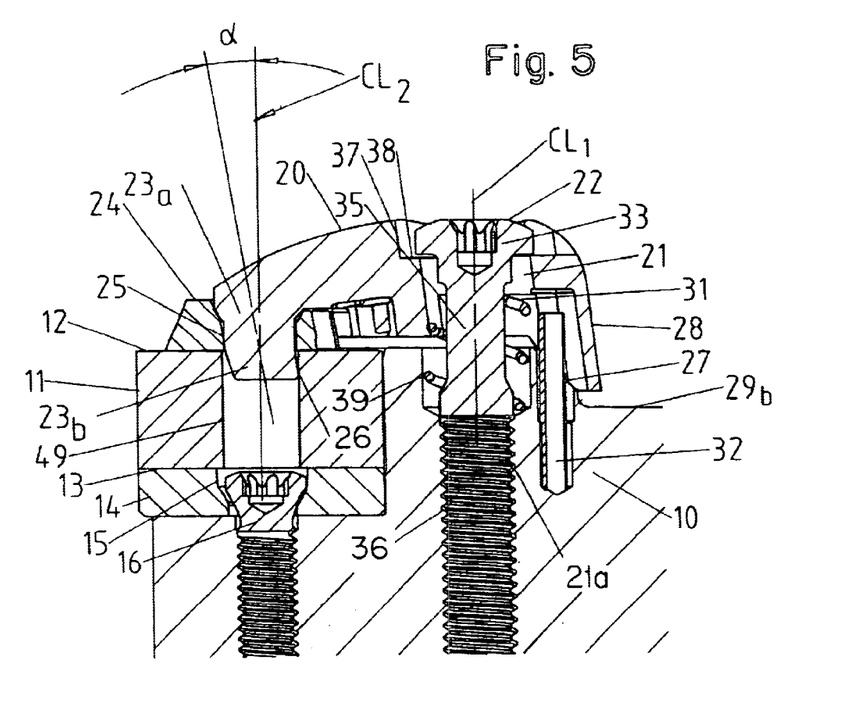
FIG. 5 is a longitudinal sectional view along a central line through an alternative embodiment of the invention.
Figure 6:
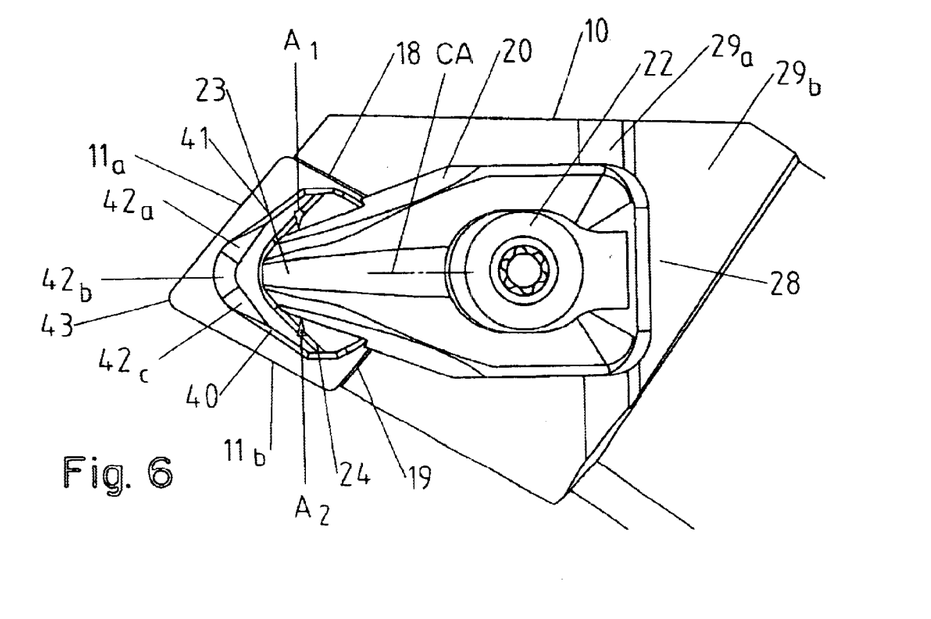
FIG. 6 is a top plan view of the structure shown in FIG. 5.

In FIG. 5 there is shown another embodiment of the invention wherein the insert 11 has a central through hole 49 with a central axis $CL_2$ that is parallel with the central axis $CL_1$ of the threaded portion 36 of the holder. In this case the forward protrusion 23 comprises an upper clamp portion 23a that extends straight downwards axially into the insert hole 46 and a lower clamp portion 23b that is inclined downwards and rearwardly at an inclined angle α (preferably 2–15°) such that the lower clamp portion 23b comes into engagement with the wall of the insert hole 49 at a contact point 26 located slightly downwards in said hole. The forward facing portion of the mantle surface of the upper clamp portion 23, and the forward portion of the wall of the hole 25 are given essentially the same form as in FIG. 1. As also appears in FIG. 5 there is no surface contact between the lower end portion of the clamp portion 28 and the upper surface of the holder.

When tightening the screw 22 the forward clamp portion 23 will be urged downwards into the insert hole 49. The clamp will thereafter exert a clamping pressure against the clamp plate 24 along the contact zones $A_1$ and $A_2$ (also in FIGS. 1–2). Upon continued tightening of the screw 22 there will occur a final clamping of the whole system during simultaneous elastic bending of said clamp.

Figure 7:
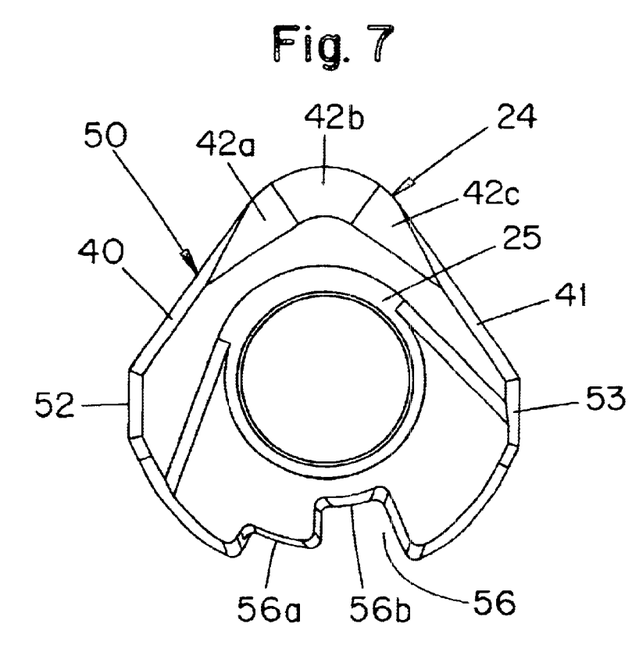
FIG. 7 is a top plan view of a clamp plate according to the invention.
Figure 8:
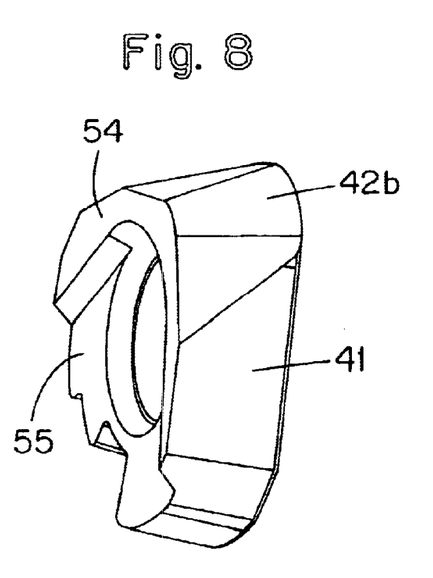
FIG. 8 is a top perspective view of the clamp plate of FIG. 7.
Figure 9:
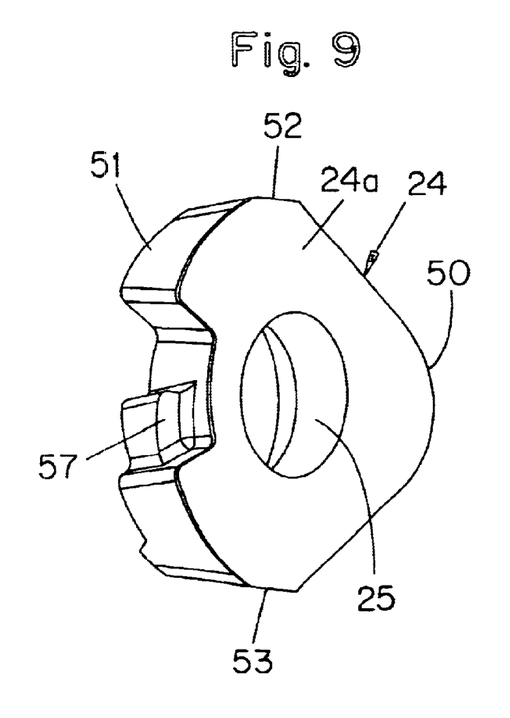
FIG. 9 is a bottom perspective view of the clamp plate of FIG. 7.

In FIG. 7–9 there are shown different detailed views of the clamp plate 24. This clamp plate is defined by a forward side face 50 with a wedge-shaped contour narrowing towards the forward cutting tip 43 of the insert 11. That is, the front side face is defined by the side face portions 40, 41 which converge in a direction away from the hole 25 to define a wedge shape. The rear side face of the clamp plate is defined by a convexly curved portion 51. The transition between said wedge portion 50 and said rear convex portion 51 is defined by two straight portions 52, 53 the edges of which extend parallel to each other. As best seen in FIG. 8, the forward portion 54 of the upper surface of the clamp plate 24 is raised in relation to the rear portion 55 of the upper surface. Preferably these surfaces 54 and 55 are planar and mutually parallel. The forward portion of the clamp arm 20 is intended to rest against said rear surface 55.

The protrusion 23 of the clamp arm extends through recess 25 of the clamp plate 24. Further, said rear convexly curved portion 51 of the clamp plate is provided with a non-symmetric recess 56 comprising a first concave portion 56a and a second concave portion 56b. The first portion 56a has a smaller radial depth (with reference to the radius of the hole 25) than the second portion 56b.

Further, said first portion 56a is provided with a shoulder 57 disposed at an elevation corresponding to a midpoint of the thickness (vertical dimension or height) of the clamp plate.

Figure 10:
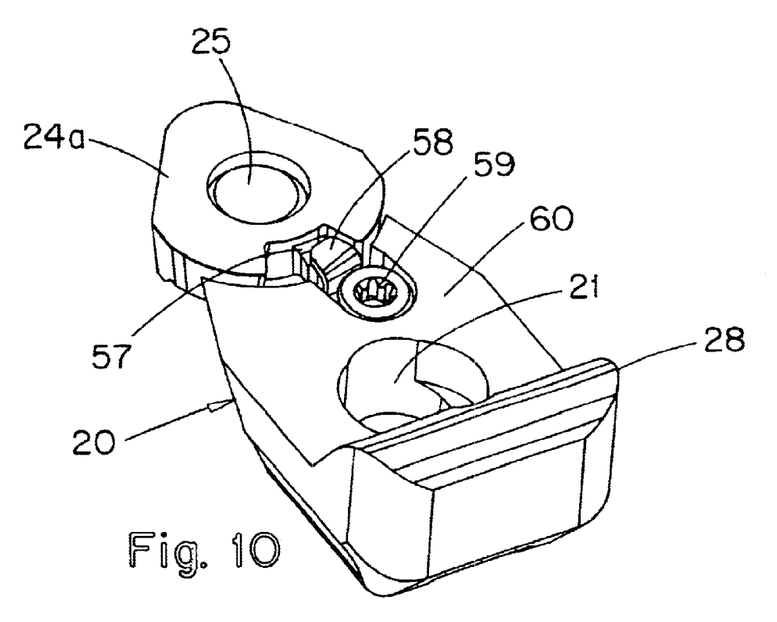
FIG. 10 is a bottom perspective view of a clamp secured to a clamp plate.
Figure 11:
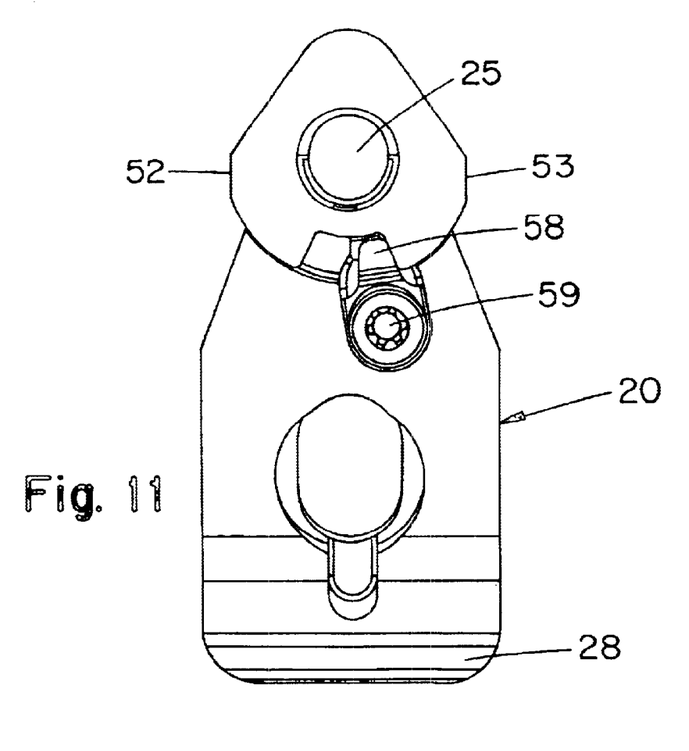
FIG. 11 is a bottom plan view of FIG. 10.

In FIGS. 10–11 is shown a perspective view and a plan view of a clamp plate 24 in cooperation with a clamp arm 20. As shown therein said shoulder 57 is intended to overlie a clamp finger 58 that extends forwardly from said clamp arm 20. When mounting of an insert occurs, this finger 58 is first brought to a free position at the area of portion 56b and the said clamp plate 24 is then rotated about an axis coinciding with a center axis X of the through-hole 25 to a position wherein said clamp finger 58 is brought beneath the shoulder 57 in surface contact therewith. This clamp finger 58 is suitably of flat shape and somewhat inclined in relation to the flat contact surface 24a of said clamp plate. Tightening of said clamp finger occurs by turning a screw 59 that is threadably engaged in the underside of said clamp plate, whereby said screw 59 is threadably engaged such that its head becomes recessed with respect to the underside 60 of said clamp arm 20.

Figure 12:
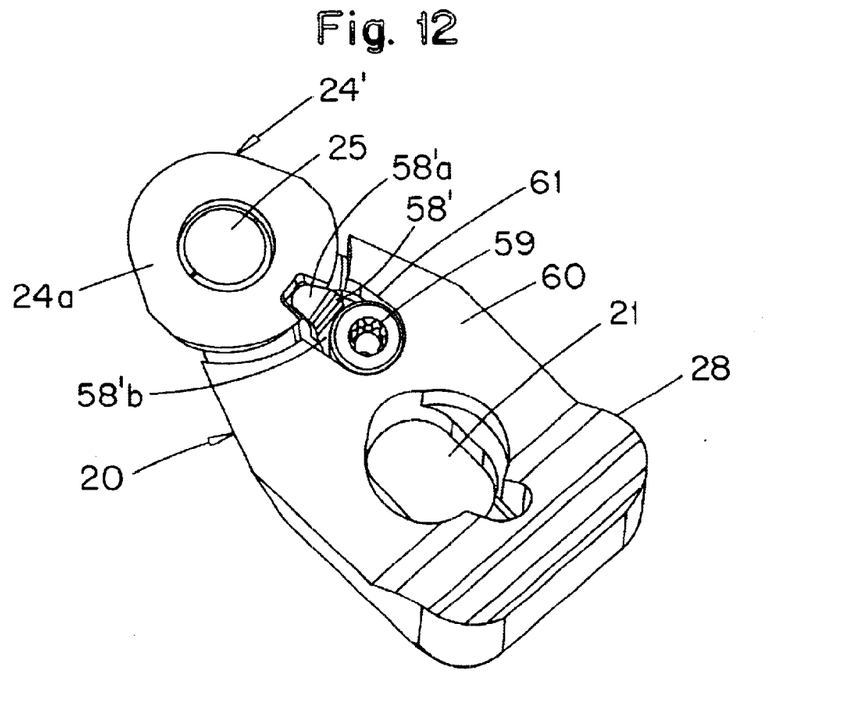
FIG. 12 is a view similar to FIG. 10 of another embodiment of a clamp.
Figure 13:
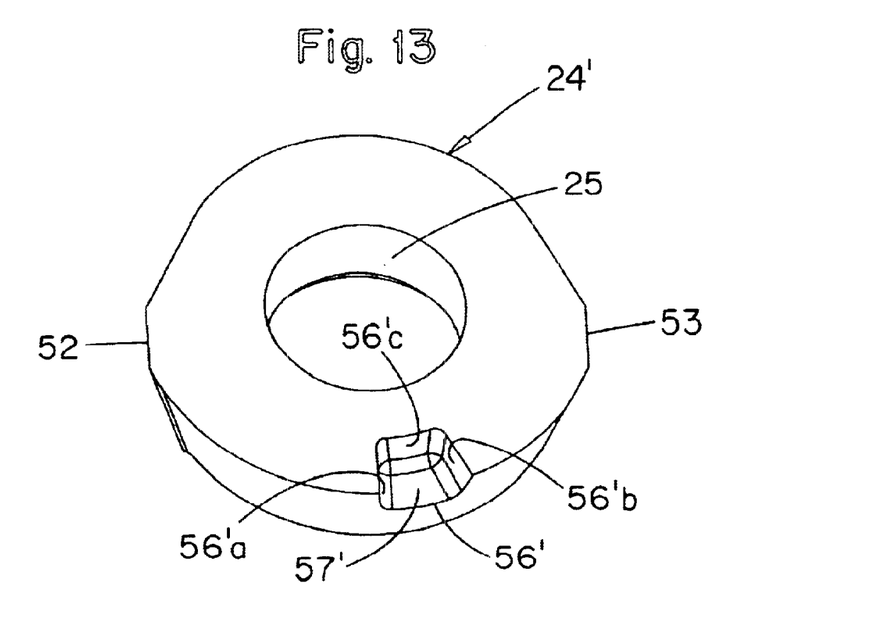
FIG. 13 is a bottom perspective view of a clamp plate used in FIG. 12.

In FIGS. 12–13 is shown an alternative embodiment of the clamp plate 24. In this case the rear convex portion 51 of the clamp plate is provided with a single recess 56' confined by a shoulder 57' disposed at an elevation corresponding to a midpoint of the thickness of said clamp plate. Also in this embodiment the clamp finger 58' is a flat metal portion of stepped configuration, comprising a first portion 58'a in contact with said shoulder 57' and a second portion 58'b clamped by a screw 59 into recess 61 of said clamp arm 20. The clamp finger-receiving recess 56 comprises two radially extending side surfaces 56'a, 56'b and an inner surface 56'c extending between said radial surfaces 56'a, 56'b.

In another alternative embodiment the clamp plate 24 could be provided with a number of cooling channels (not shown) on its underside aimed to have a number of cooling streams directed towards the cutting tip whilst being supplied with cooling liquid from the interior portion of said holder body 10.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. A clamp plate adapted to transmit downward pressure from a clamp arm to a cutting insert disposed in a pocket of a holder, the clamp plate including top and bottom faces and side faces interconnecting the top and bottom faces, a through-hole extending through the clamp plate from the top face to the bottom face, a first of the side faces comprising two side face portions converging in a direction away from the through-hole and away from a second side face, the second side face being convexly curved, a first portion of the clamp plate having the first side face being thicker than a second portion of the clamp plate having the second curved side face, wherein the second portion of the clamp plate including a recess extending toward the through-hole and terminating short of the through-hole to divide the second side surface into first and second concave portions, the recess also extending from the bottom face upwardly toward the top face, at least a portion of the recess terminating short of the top face to form a downwardly facing shoulder.

2. The clamp plate according to claim 1 wherein only a portion of the recess terminates short of the top face.

3. The clamp plate according to claim 1 wherein all of the recess terminates short of the top face.

4. A clamp plate adapted to transmit downward pressure from a clamp arm to a cutting insert disposed in a pocket of a holder, the clamp plate including top and bottom faces and side faces interconnecting the top and bottom faces, a through-hole extending through the clamp plate from the top face to the bottom face, a first of the side faces comprising two side face portions converging in a direction away from the through-hole and away from a second side face, the second side face being convexly curved, a first portion of the clamp plate having the first side face being thicker than a second portion of the clamp plate having the second side face, wherein the first side face includes a convexly curved nose portion disposed between the two side face portions; the two side face portions being flat and converging toward the nose portion and forming with one another an acute angle smaller than an acute angle defined by the nose portion disposed between the two side face portions; the first side face further including a pair of flat side surfaces disposed between the nose and respective ones of the side face portions, the flat surfaces extending downwardly from the top face and forming a larger angle with the top face than do the two side face portions.

5. The clamp plate according to claim 4 wherein the additional side surfaces are inclined downwardly from the top face of the clamp plate at an angle of 20–45 degrees, and the side face portions are inclined downwardly from the top face at an angle from 5–15 degrees.

* * * * *